(12) United States Patent
Seong et al.

(10) Patent No.: US 11,294,903 B2
(45) Date of Patent: Apr. 5, 2022

(54) PARTITION-WISE PROCESSING DISTRIBUTION

(71) Applicant: SAP SE, Walldorf (DE)

(72) Inventors: JunGyoung Seong, Seoul (KR); Jane Jung Lee, Seoul (KR); Jung Kook Lee, Seoul (KR); Sehee Shim, Seoul (KR)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 16/373,950

(22) Filed: Apr. 3, 2019

(65) Prior Publication Data

US 2020/0320077 A1 Oct. 8, 2020

(51) Int. Cl.
*G06F 16/2453* (2019.01)
*G06F 16/2458* (2019.01)

(52) U.S. Cl.
CPC .... *G06F 16/24545* (2019.01); *G06F 16/2471* (2019.01); *G06F 16/24537* (2019.01)

(58) Field of Classification Search
CPC .......... G06F 16/24542; G06F 16/2453; G06F 16/24537; G06F 16/24545; G06F 16/2471; G06F 16/278
See application file for complete search history.

(56) References Cited

U.S. PATENT DOCUMENTS

| | | | | |
|---|---|---|---|---|
| 2014/0164353 A1* | 6/2014 | Shankar | ............ | G06F 16/24532 707/714 |
| 2015/0149442 A1* | 5/2015 | Kim | ................ | G06F 16/24545 707/719 |
| 2016/0371328 A1* | 12/2016 | Li | ..................... | G06F 16/24554 |
| 2018/0314733 A1* | 11/2018 | Wen | ................. | G06F 16/24542 |

* cited by examiner

*Primary Examiner* — David T. Brooks
*Assistant Examiner* — Lana Alagic
(74) *Attorney, Agent, or Firm* — Buckley, Maschoff & Talwalkar LLC (57) ABSTRACT

A system includes determination, for a first partitioned physical query operator in a query operator tree, of a partition-wise placement cost based on a cost of each table partition associated with the first partitioned physical query operator and a partition-wise placement cost of any child physical query operator of the first partitioned physical query operator, determination of a placement cost for the first partitioned physical query operator physical query operator for each of a plurality of operator execution locations based on the determined partition-wise placement cost, determination, for a logical query operator associated with the first partitioned physical query operator, of a merged placement cost for each of the plurality of operator execution locations, and determination an execution location for the first partitioned physical query operator based on the determined partition-wise placement cost.

18 Claims, 10 Drawing Sheets

PARTITION-WISE PROCESSING DISTRIBUTION

BACKGROUND

Database systems may provide distributed data storage and distributed query execution. For example, a database system may include one or more database nodes, each of which stores unique data and is capable of executing query operators. A distributed architecture may therefore require the execution of queries on data which spans multiple database nodes.

A database table in a distributed architecture may include several partitions stored at different database nodes. Conventionally, in order to perform query operations on a partitioned table, the partitions of the table are unioned at a database node and the database node then executes query operations on the unioned partitions. Such techniques may be inefficient due to data transfer and other costs. Techniques are needed to efficiently execute query operators on partitioned tables.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments relate to determination, based on partition location and operator execution costs, of database nodes on which to execute particular query operators of a given query. For example, for each partitioned physical query operator in a query operator tree, a partition-wise placement cost is determined based on a cost of each associated partition and a partition-wise placement cost of any child physical query operator. A placement cost is then determined for each partitioned physical query operator for each database node based on an associated partition-wise placement cost. In the case of a non-partitioned physical query operator, the placement cost is determined based on any placement costs of child physical operators. For each logical query operator, a merged placement cost is then determined for each location.

The determined costs are then used to determine the server nodes on which to execute each physical query operator. For each partitioned physical operator, the execution location is determined based on its determined partition-wise placement cost. For each non-partitioned physical operator, the execution location is determined based on its determined placement cost. As a result, some embodiments optimize processing based on partition locations.

Figure 1:
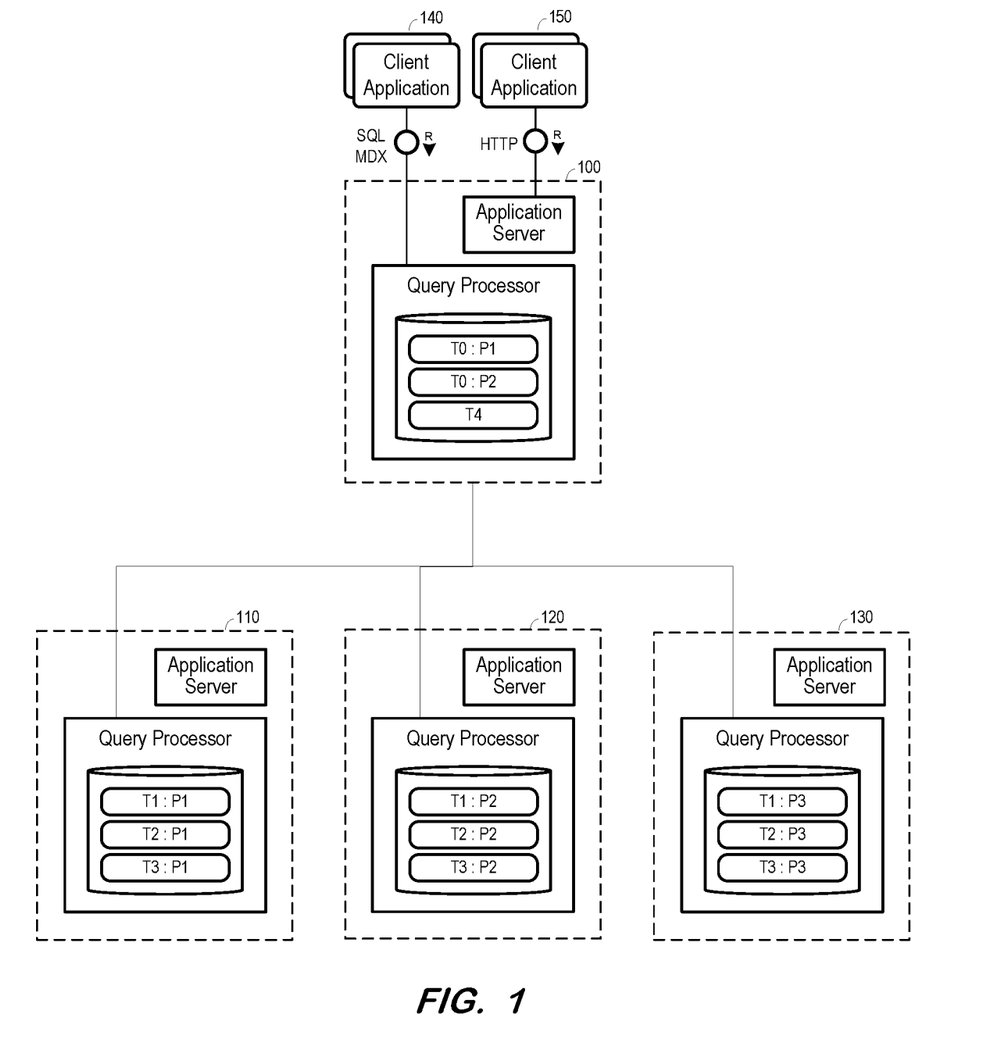
FIG. 1 is a block diagram of a distributed database system according to some embodiments.

FIG. 1 is a block diagram of a distributed database architecture according to some embodiments. Embodiments are not limited to the FIG. 1 architecture.

FIG. 1 illustrates server nodes 100, 110, 120 and 130. Although FIG. 1 illustrates node 100 receiving requests from client applications 140 and 150, generally, any one of nodes 100, 110, 120 and 130 may receive a query from client applications 140 and 150 and returns results thereto based on data stored within nodes 100, 110, 120 and 130. If the server node receiving the request does not store all of the data needed to fulfill the request, execution of some operations may be delegated to other server nodes as will be described in detail below.

Each of nodes 100, 110, 120 and 130 executes program code to provide an application server and a query processor. The application server provides services for executing server applications. For example, Web applications executing on an application server may receive HyperText Transfer Protocol (HTTP) requests from client applications 150 as shown in FIG. 1.

A query processor contains the actual stored data and engines for processing the data. An execution engine of a query processor may provide one or more physical operators corresponding to one or more logical operators. The physical operators may comprise processor-executable program code which is executable to perform corresponding logical operations (e.g., INSERT, JOIN, SELECT, etc.) on stored data. The set of logical operators for which an execution engine includes one or more physical operators might not be identical across execution engines. Moreover, a physical operator provided by one execution engine and corresponding to a logical operator may differ from a physical operator provided by another execution engine and corresponding to the same logical operator. The data format output by various physical operators of various execution engines (even those corresponding to a same logical operator) may differ as well.

The query processor is responsible for processing Structured Query Language (SQL) and Multi-Dimensional eXpression (MDX) statements and may receive such statements directly from client applications 140. The query processor may also include a statistics server for use in determining query execution plans. A compilation server may also be provided to compile stored procedures and programs.

Each of server nodes 100, 110, 120 and 130 may include many additional software components providing functionality that is or becomes known. For example, server nodes 100, 110, 120 and 130 may include components to perform administrative and management functions. Such functions may include snapshot and backup management, indexing, optimization, garbage collection, and/or any other database functions that are or become known.

In some embodiments, the data of server nodes 100, 110, 120 and 130 may comprise one or more of conventional tabular data, row-based data, column-based data, and object-based data. Moreover, the data may be indexed and/or selectively replicated in an index to allow fast searching and retrieval thereof. Server nodes 100, 110, 120 and 130 may support multi-tenancy to separately support multiple unrelated clients by providing multiple logical database systems which are programmatically isolated from one another.

One or more of server nodes 100, 110, 120 and 130 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of server nodes 100, 110, 120 and 130 includes table partitions. The notation Tt:Pp represents partition p of table Tt. As shown, some tables (e.g., T1, T2, T3) consist of partitions stored on different server nodes. The partitions of table T0 are stored entirely on server node 100, and Table T4 of server node 100 is not partitioned. A table may be hash-partitioned, range-partitioned, or round-robin partitioned. As will be described below, some embodiments may operate in conjunction with source and target tables including partitions of same of different types.

Figure 2:
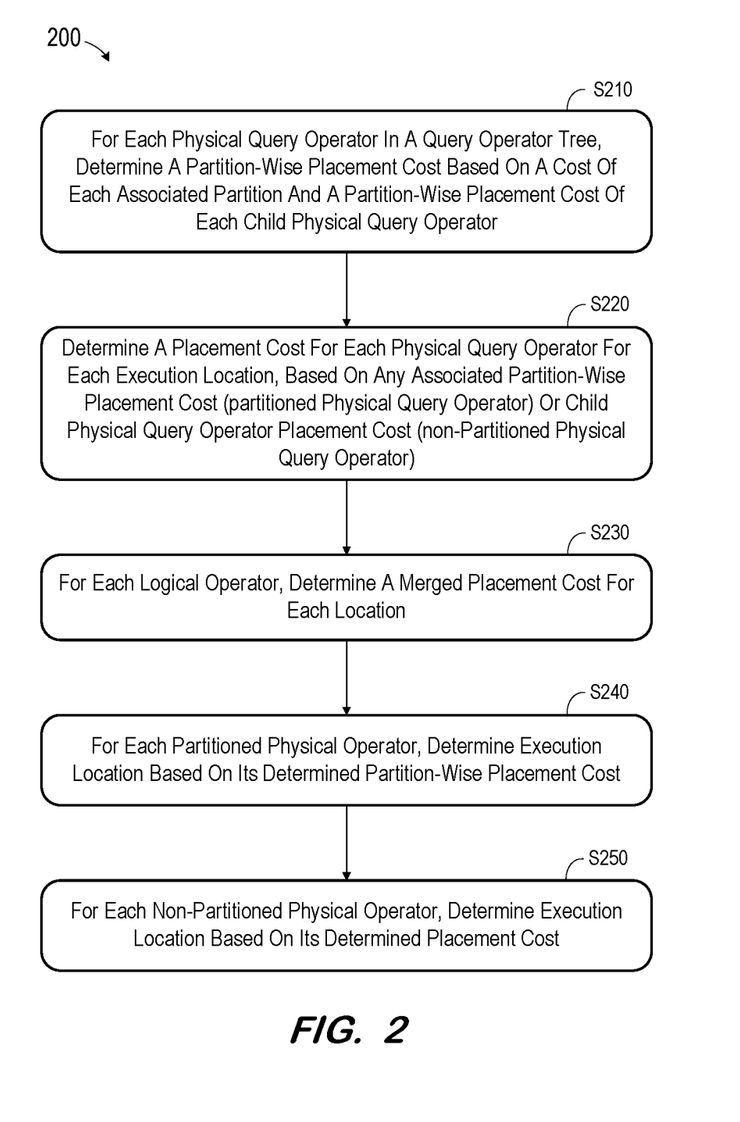
FIG. 2 is a flow diagram to determine execution locations for query operators of a query on partitioned and distributed database table data according to some embodiments.

FIG. 2 comprises a flow diagram of process 200 according to some embodiments. In some embodiments, various hardware elements of server node 100 execute program code to perform process 200. Process 200 and all other processes mentioned herein may be embodied in computer-executable program code read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 200 may be applied to a query operator tree consisting of any type of operators and any number of hierarchical levels. Embodiments are not limited to join operators or to operators having two input partitions.

Figure 3:
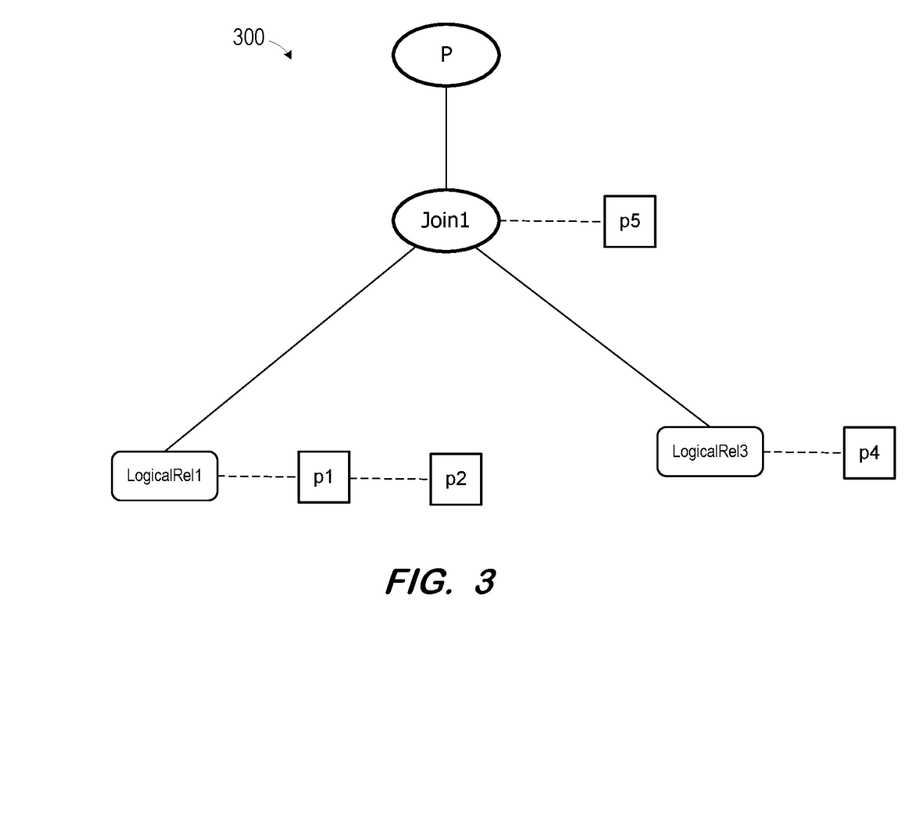
FIG. 3 illustrates logical and physical operators of a query on partitioned and distributed database table data according to some embodiments.

To describe some embodiments by way of an example, FIG. 3 is a diagram of a query operator tree 300 representing a received query. According to some embodiments, the query represented by tree 300 is received by server node 100. The query includes a logical relationship (LogicalRel1) which may be executed by alternative physical operators p1 and p2. It will be assumed that LogicalRel1 operates on data partitions 2 and 3 and therefore physical operators p1 and p2 are partitioned physical operators. Logical relationship LogicalRel3 may be executed by physical operator p4. It will be assumed LogicalRel3 operates on a non-partitioned table and therefore physical operator p4 is a non-partitioned physical operator.

At S210 of process 200, a partition-wise placement cost is determined for each partitioned physical query operator. The determination is based on a cost of each associated partition and on a partition-wise placement cost of any child physical query operator. With respect to partitioned physical operators p1 and p2 of the present example, no child operators exist so their partition-wise placement costs are determined based solely on a cost of each associated partition.

Figure 4:
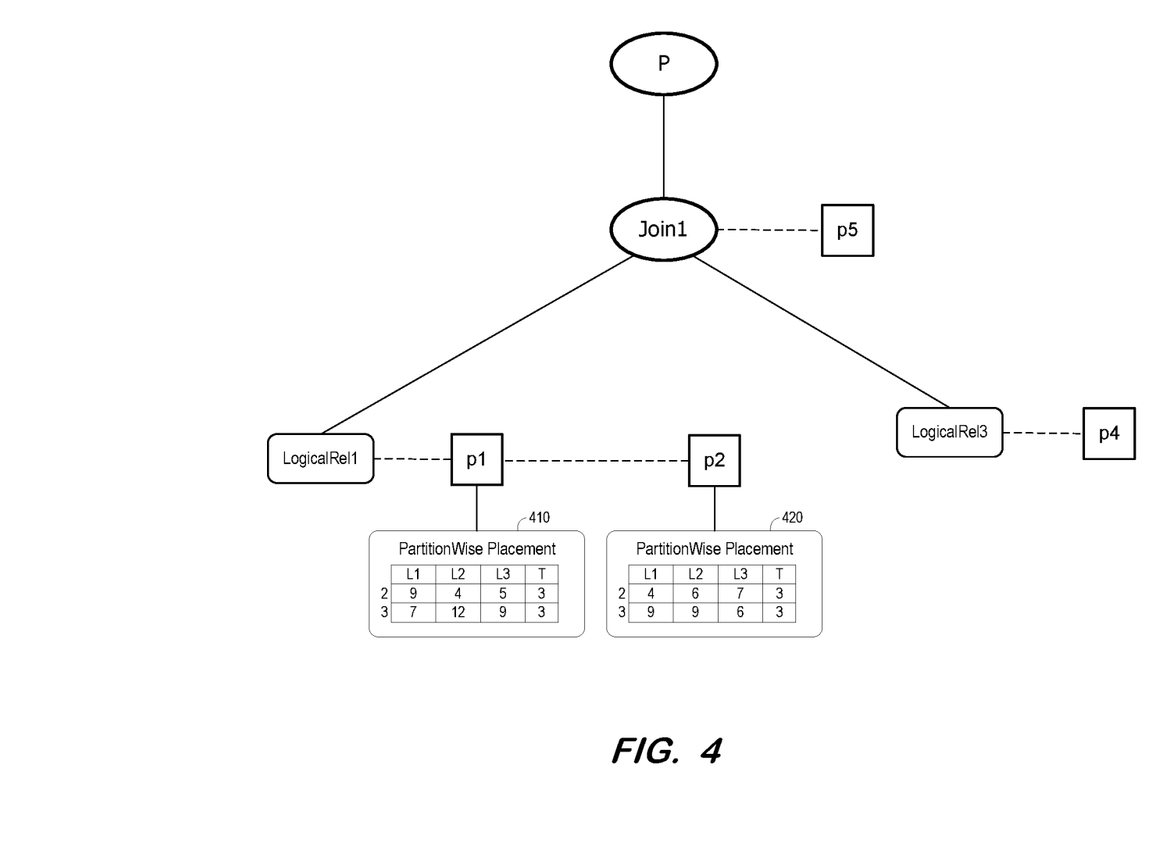
FIG. 4 illustrates determination of partition-wise placement costs for partitioned physical operators according to some embodiments.

As shown in FIG. 4, partition-wise placement cost 410 is determined for operator p1 with respect to partitions 2 and 3, which are the partitions on which operator p1 operates. Each partition is associated with a cost for each possible execution location (i.e., L1, L2 and L3) and a transfer cost (i.e., T). Similarly, partition-wise placement cost 420 is determined for alternative operator p2 with respect to partitions 2 and 3, including a cost for each possible execution location (i.e., L1, L2 and L3) and a transfer cost (i.e., T).

A placement cost is then determined at S220 for each physical query operator for each execution location. In the case of partitioned physical query operators, the placement cost is determined by consolidating the associated partition-wise placement cost. In the case of a non-partitioned physical query operator, the placement cost is determined based on placement costs of any child physical operators.

Figure 5:
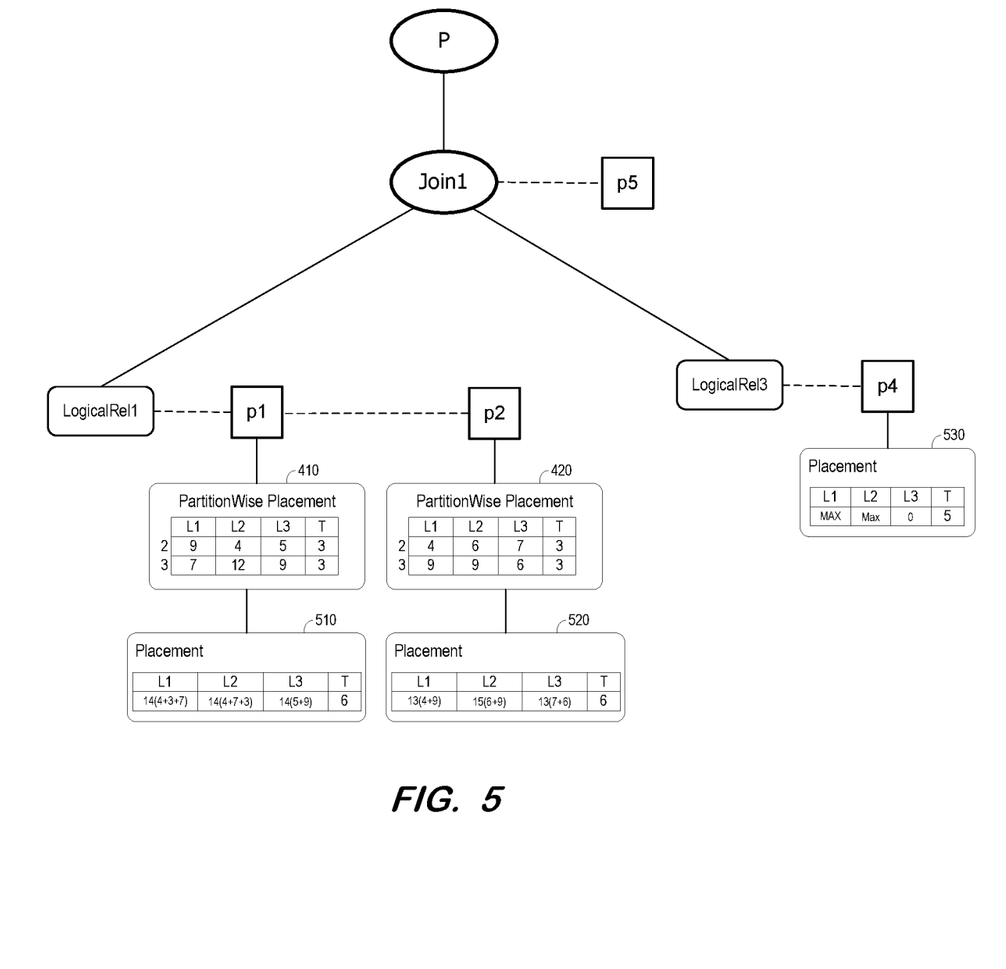
FIG. 5 illustrates determination of placement costs for partitioned and non-partitioned physical operators according to some embodiments.

In one example of S220, FIG. 5 illustrates the determination of placement cost 510 for partitioned physical operator p1 based on partition-wise placement cost 410, and the determination of placement cost 520 for partitioned physical operator p2 based on partition-wise placement cost 420. Since physical operator p4 is non-partitioned, placement cost 530 is determined as 0 for the location (i.e., L1) on which its partition (i.e., partition 0) resides, and as a maximum for each other location.

Figure 6:
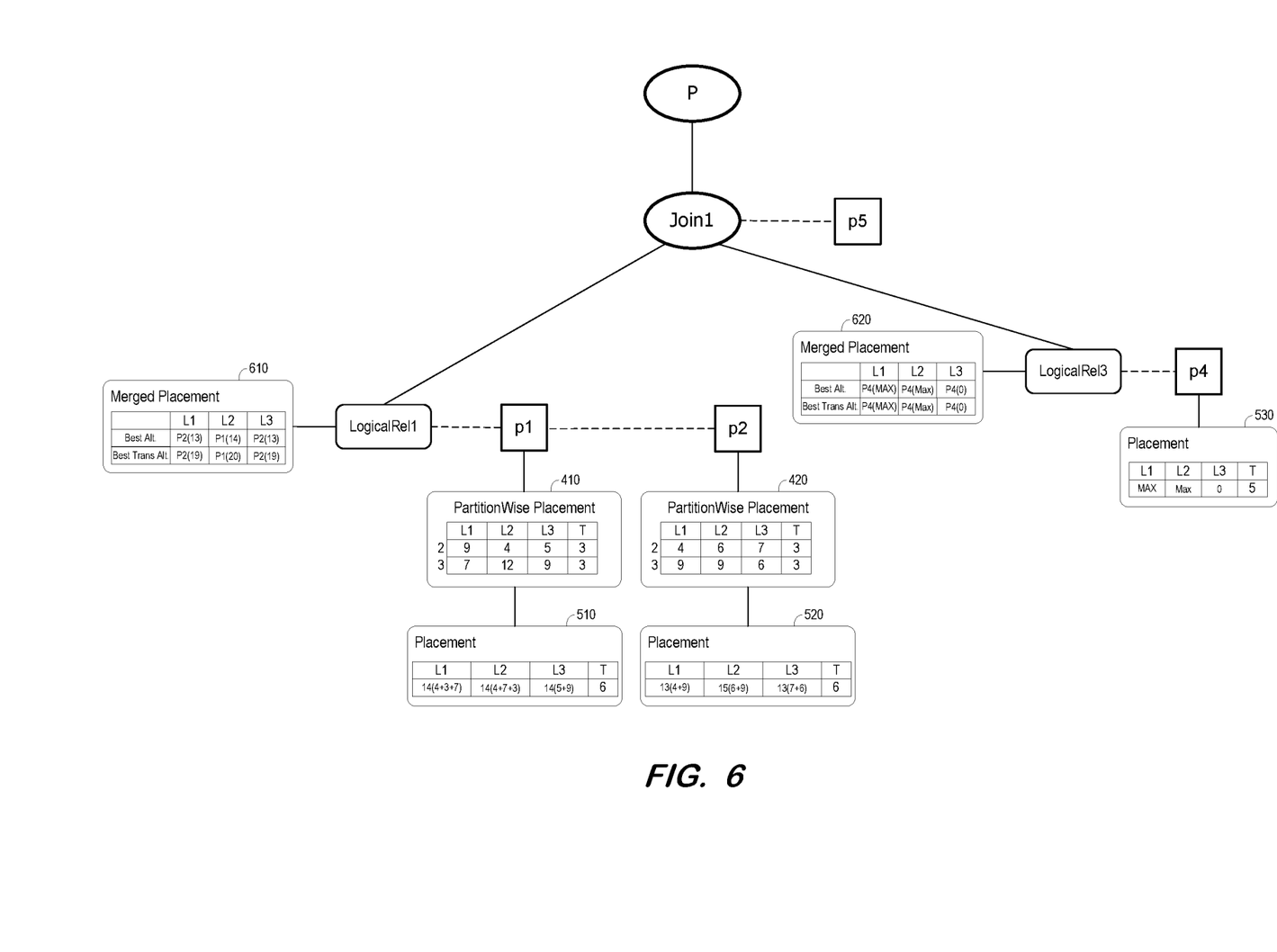
FIG. 6 illustrates determination of merged placement costs for each execution location according to some embodiments.

Next, at S230, for each logical operator, a merged placement cost is determined for each location. The merged placement cost indicates a best physical operator and its cost among alternative physical operators. FIG. 6 illustrates merged placement cost 610 and 620 associated with LogicalRel1 and LogicalRel3, respectively. As shown, merged placement cost 610 and 620 shows, for each execution location, a physical operator associated with a lowest cost, as well as the lowest cost.

Figure 7:
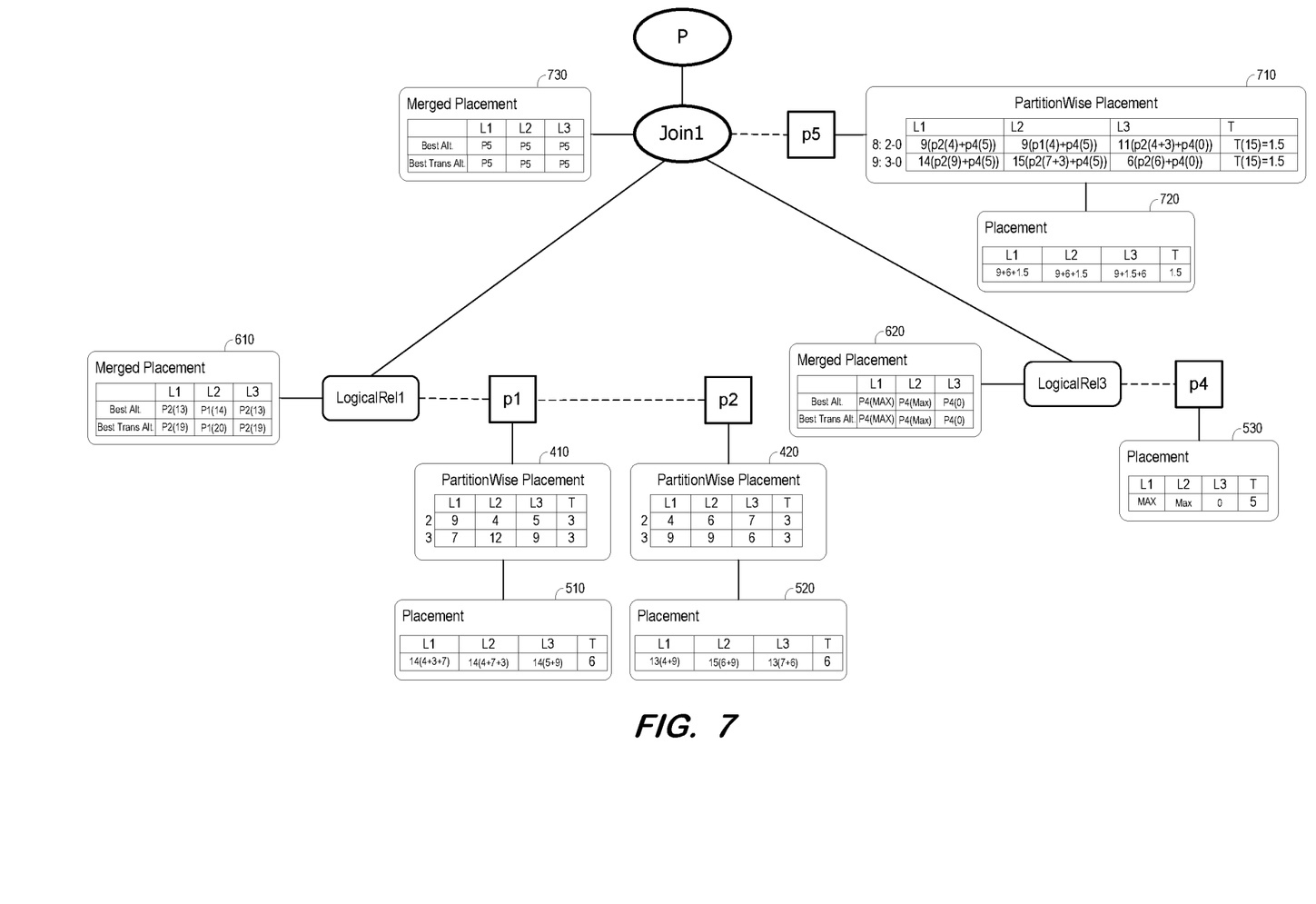
FIG. 7 illustrates determination of partition-wise placement costs, placement costs, and merged placement costs for a partitioned parent physical operator according to some embodiments.

FIG. 7 shows costs determined at S210, S220 and S230 for partitioned physical operator p5 according to some embodiments. Operator p5 joins partition 2 with rows of partition 0 and joins partition 3 with rows of partition 0. Partition-wise placement cost 710 shows the lowest cost of each of these joins for each execution location, and indicates the child physical operators associated with each of the lowest-cost execution. Placement cost 720 is generated by consolidating cost 710 at S220 as described above. Since only one physical operator (i.e., p5) corresponds to Join1, merged placement cost 730 simply indicates operator p5 for each execution location.

At S245 and S250, the determined costs are used to determine physical operators and execution locations on a partition-wise basis. At S240, the execution location for each partitioned physical operator is determined based on its determined partition-wise placement cost. For each non-partitioned physical operator, the execution location is determined at S250 based on its determined placement cost. While S210, S220 and S230 comprise bottom-up determinations, S240 and S250 proceed from the top of a query tree.

Figure 8:
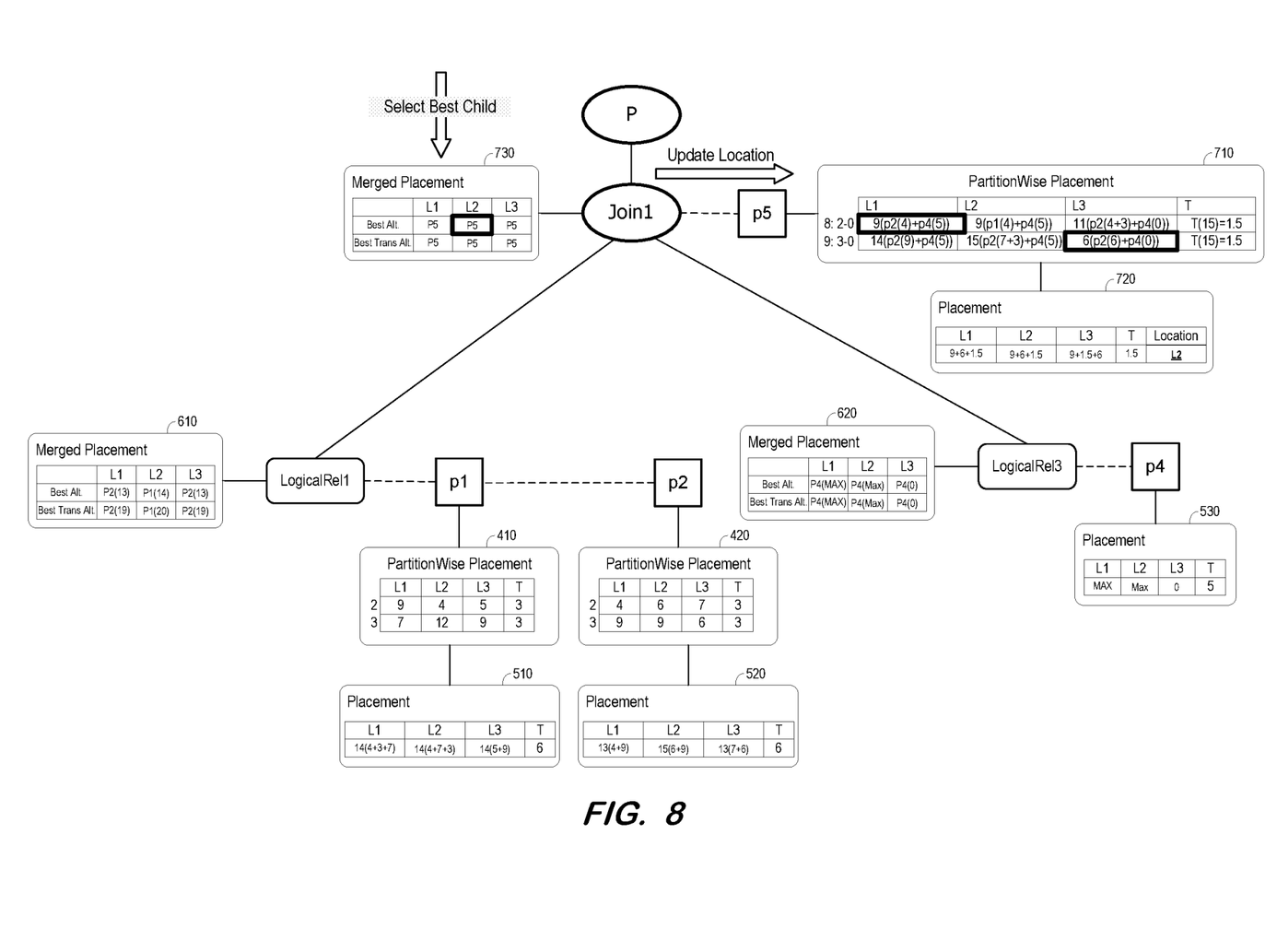
FIG. 8 illustrates top-down determination of execution locations for a partitioned parent physical operator according to some embodiments.
Figure 9:
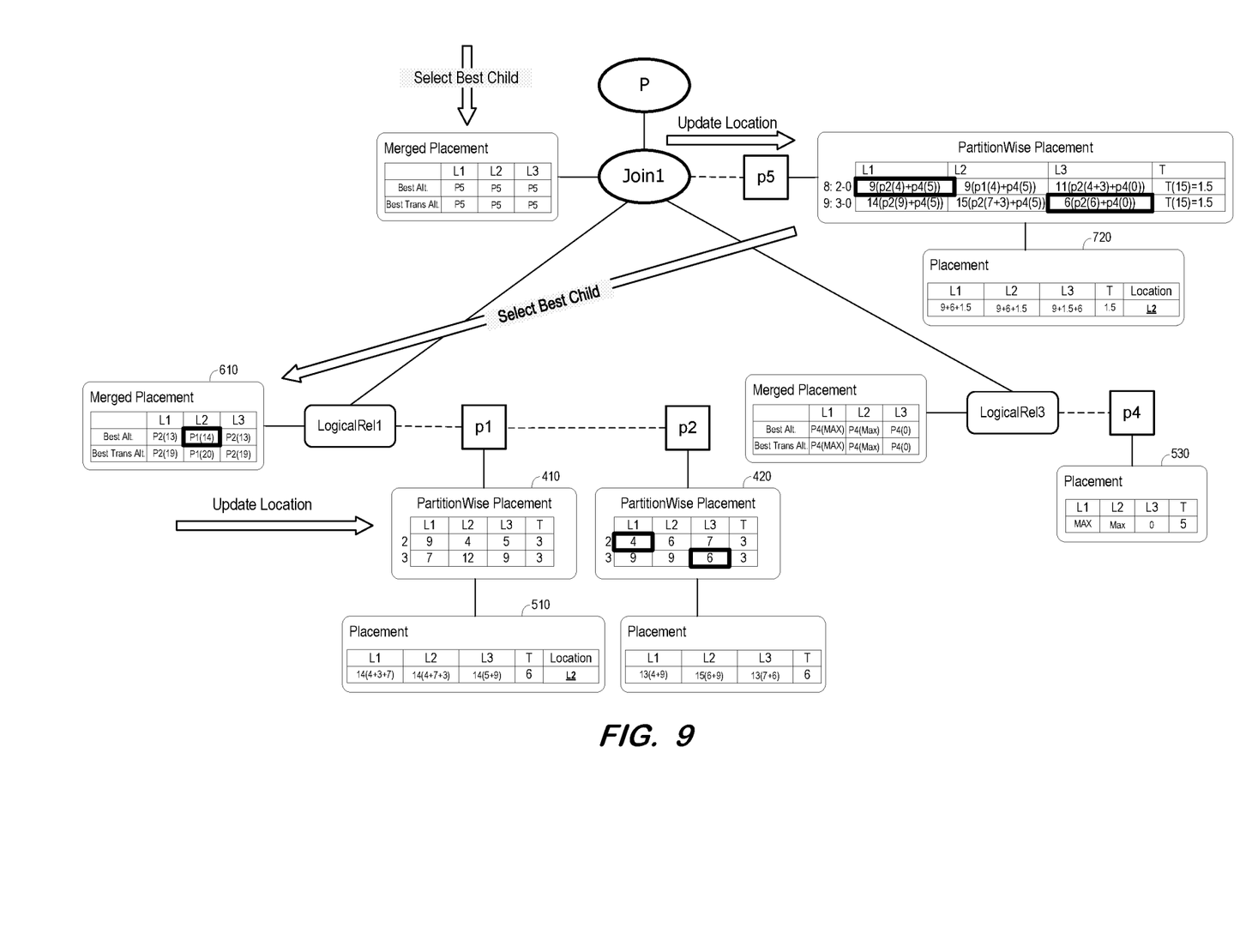
FIG. 9 illustrates top-down determination of execution locations for a partitioned physical operator according to some embodiments.

FIGS. 8 and 9 illustrate an example of S240 and S250 according to some embodiments. As shown in FIG. 8, best child p5 is determined from merged placement 730. Next, locations of partitions 8 (i.e., join of partitions 2 and 0) and 9 (i.e., join of partitions 3 and 0) are determined. It will be assumed that the parent of partition 8 is located at L1, in which case partition-wise placement 710 shows that the cost of placing partition 8 on L1 is 9, the cost of placing partition 8 on L2 is 9+1.5, and the cost of placing partition 8 on L3 is 11+1.5. Accordingly, it is determined to place partition 8 on location L1.

Similarly, if the parent location of partition 9 is L1, partition-wise placement 710 shows that the cost of placing partition 9 on L1 is 14, the cost of placing partition 9 on L2 is 15+1.5, and the cost of placing partition 9 on L3 is 6+1.5. Accordingly, it is determined to place partition 9 on location L3.

Partition-wise placement 710 shows that child physical operators p2 (for partition 2) and p4 (for partition 0) result in the lowest cost of placing partition 8 on L1. Partition-wise placement 420 shows that, assuming the parent (i.e., partition 8) is located at L1, the cost of placing partition 2 on L1 is 4, the cost of placing partition 2 on L2 is 6+3, and the cost of placing partition 2 on L3 is 7+3. It is therefore determined to place partition 2 on location L1.

Partition-wise placement 710 also shows that child physical operators p2 (for partition 2) and p4 (for partition 0) result in the lowest cost of placing partition 9 on L3. Partition-wise placement 420 shows that, assuming parent partition 9 is located at L3, the cost of placing partition 3 on L1 is 9+3, the cost of placing partition 3 on L2 is 9+3, and the cost of placing partition 3 on L3 is 6. It is therefore determined to place partition 3 on location L3.

If, for example, it was determined that partition 8 should be located at L2 then child physical operators p1 and p4 are selected. However, it was determined that partition 9 should be located at L3 then child physical operators p2 and p4 are selected. Some embodiments are therefore required to choose one of physical operators p1 and p2 to serve as LogicalRel1. In such a case, partition-wise placement 710 is recalculated without considering physical operator p1, and is also recalculated without considering physical operator p2. The costs of the best partition locations of the first recalculated partition-wise placement 710 are summed, the costs of the best partition locations of the second recalculated partition-wise placement 710 are summed, and the partition locations and physical operators associated with the lowest of the two summed costs are selected.

Figure 10:
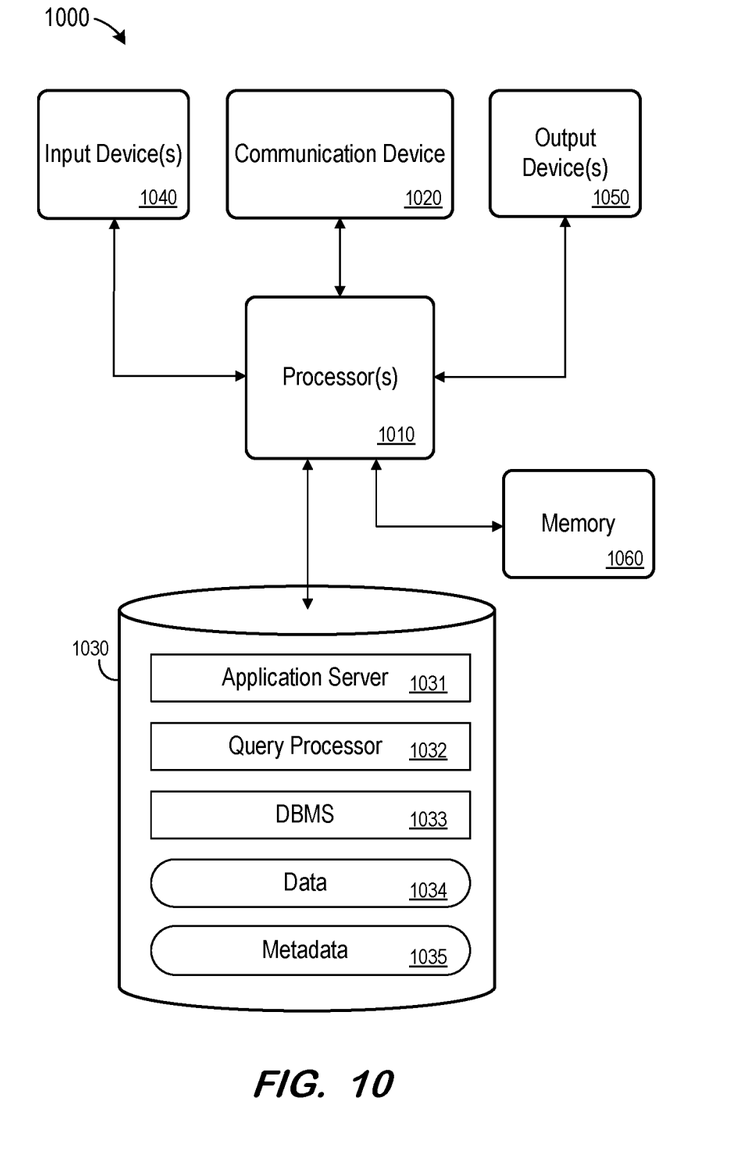
FIG. 10 is a block diagram of a database node according to some embodiments.

FIG. 10 is a block diagram of server node 1000 according to some embodiments. Server node 1000 may comprise a general-purpose computing apparatus and may execute program code to perform any of the functions described herein. Server node 1000 may comprise an implementation of server node 100 in some embodiments. Server node 1000 may include other unshown elements according to some embodiments.

Server node 1000 includes processor(s) 1010 operatively coupled to communication device 1020, data storage device 1030, one or more input devices 1040, one or more output devices 1050 and memory 1060. Communication device 1020 may facilitate communication with external devices, such as a reporting client, or a data storage device. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to enter information into apparatus 1000. Output device(s) 1050 may comprise, for example, a display (e.g., a display screen) a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, etc., while memory 1060 may comprise Random Access Memory (RAM).

Application server 1031 and query processor 1032 may each comprise program code executed by processor(s) 1010 to cause server 1000 to perform any one or more of the processes described herein. Embodiments are not limited to execution of these processes by a single computing device.

Data 1034 may include conventional partitioned database data as described above. As also described above, database data (either cached or a full database) may be stored in volatile memory such as volatile memory 1060. Data storage device 1030 may also store data and other program code for providing additional functionality and/or which are necessary for operation of server 1000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing processor-executable program code; and
a processor to execute the processor-executable program code in order to cause the system to:
determine, starting at a lowest level of a query operator tree representation of a query of data stored in one or more table partitions within a plurality of operator execution locations for a first partitioned physical query operator in the query operator tree, a partition-wise placement cost based on a cost attribute of each of the one or more table partitions associated with the first partitioned physical query operator and a partition-wise placement cost of any child physical query operator of the first partitioned physical query operator, the first partitioned physical query operator operating on the one or more table partitions within the plurality of operator execution locations and the partition-wise placement cost for each of the one or more table partitions including a cost attribute for each of the plurality of operator execution locations and a transfer cost for the first partitioned physical query operator;
determine a placement cost for the first partitioned physical query operator for each of the plurality of operator execution locations based on a consolidation of the determined partition-wise placement costs for the first partitioned physical query operator;
determine, for a logical query operator associated with the first partitioned physical query operator, a merged placement cost for each of the plurality of operator execution locations, the merged placement cost including an indication of the physical query operator having a lowest cost value with and without the transfer cost of the partition-wise placement cost for the first logical query operator; and determine an execution location for the first partitioned physical query operator based on the determined partition-wise placement cost for the first partitioned physical query operator by traversing the query operator tree starting from a highest level down to the lowest level of the query operator tree.

2. A system according to claim 1, the processor to execute the processor-executable program code in order to cause the system to:

determine, for a first non-partitioned physical query operator in the query operator tree, a second placement cost for each of the plurality of operator execution locations based on placement costs of any child physical operators of the first non-partitioned physical query operator;

determine, for a second logical query operator associated with the first non-partitioned physical query operator, a second merged placement cost for each of the plurality of operator execution locations, the second merged placement cost including an indication of the physical query operator having a lowest cost value with and without the transfer cost of the partition-wise placement cost for the second logical query operator; and determine an execution location for the first non-partitioned physical query operator based on the determined second placement cost for the second non-partitioned physical query operator by traversing the query operator tree starting from the highest level down to the lowest level of the query operator tree.

3. A system according to claim 2, the processor to execute the processor-executable program code in order to cause the system to:

determine, for a second partitioned physical query operator in the query operator tree where the second partitioned physical query operator is a parent of the first partitioned physical query operator, a third partition-wise placement cost based on a cost attribute of each of the one or more table partitions associated with the second partitioned physical query operator and the partition-wise placement cost of the first partitioned physical query operator, the second partitioned physical query operator operating on the one or more table partitions within the plurality of operator execution locations and the partition-wise placement cost for each of the one or more table partitions including a cost for each of the plurality of operator execution locations and a transfer cost for the second partitioned physical query operator;

determine a third placement cost for the second partitioned physical query operator physical query operator for each of the plurality of operator execution locations based on a consolidation of the determined third partition-wise placement cost for the second partitioned physical query operator;

determine, for a third logical query operator associated with the second partitioned physical query operator, a second merged placement cost for each of the plurality of operator execution locations, the second merged placement cost including an indication of the physical query operator having a lowest cost value with and without the transfer cost of the partition-wise placement cost for the second partitioned physical query operator; and determine an execution location for the second partitioned physical query operator based on the determined third partition-wise placement cost for the second partitioned physical query operator by traversing the query operator tree starting from the highest level down to the lowest level of the query operator tree.

4. A system according to claim 3, the processor to execute the processor-executable program code in order to cause the system to:

determine, for a third partitioned physical query operator in the query operator tree where the third partitioned physical query operator is associated with the logical query operator, a fourth partition-wise placement cost based on a cost attribute of each of the one or more table partitions associated with the third partitioned physical query operator;

determine a fourth placement cost for the third partitioned physical query operator for each of the plurality of operator execution locations based on the determined fourth partition-wise placement cost, the third partitioned physical query operator operating on the one or more table partitions within the plurality of operator execution locations and the fourth partition-wise placement cost for each partition including a cost attribute for each of the plurality of operator execution locations and a transfer cost for the third partitioned physical query operator; and determine one of the first partitioned physical query operator and the third partitioned physical query operator to execute the logical query operator based on the merged placement cost for the first partitioned physical query operator and the third partitioned physical query operator by traversing the query operator tree starting from the highest level down to the lowest level of the query operator tree, wherein the first partitioned physical query operator and the third partitioned physical query operator determined to have the lowest cost value is selected to execute the logical query operator.

5. A system according to claim 1, the processor to execute the processor-executable program code in order to cause the system to:

determine, for a second partitioned physical query operator in the query operator tree where the second partitioned physical query operator is a parent of the first partitioned physical query operator, a second partition-wise placement cost based on a cost attribute of each of the one or more table partitions associated with the second partitioned physical query operator and the partition-wise placement cost of the first partitioned physical query operator, the second partitioned physical query operator operating on the one or more table partitions within the plurality of operator execution locations and the partition-wise placement cost for each of the one or more table partitions including a cost attribute for each of the plurality of operator execution locations and a transfer cost for the second partitioned physical query operator;

determine a second placement cost for the second partitioned physical query operator for each of the plurality of operator execution locations based on a consolidation of the determined second partition-wise placement costs for the second partitioned physical query operator;

determine, for a second logical query operator associated with the second partitioned physical query operator, a second merged placement cost for each of the plurality of operator execution locations, the second merged placement cost including an indication of the physical query operator having a lowest cost value with and without the transfer cost of the second partition-wise placement cost; and determine an execution location for the second partitioned physical query operator based on the determined second partition-wise placement cost for the second partitioned physical query operator by traversing the query operator tree starting from the highest level down to the lowest level of the query operator tree.

6. A system according to claim 1, the processor to execute the processor-executable program code in order to cause the system to:

determine, for a second partitioned physical query operator in the query operator tree where the second partitioned physical query operator is associated with the logical query operator, a second partition-wise placement cost based on a cost attribute of each of the one or more table partitions associated with the second partitioned physical query operator;

determine a second placement cost for the second partitioned physical query operator for each of the plurality of operator execution locations based on a consolidation of the determined second partition-wise placement costs for the first partitioned physical query operator; and determine one of the first partitioned physical query operator and the second partitioned physical query operator to execute the logical query operator based on the merged placement cost by traversing the query operator tree starting from the highest level down to the lowest level of the query operator tree, wherein the first partitioned physical query operator and the second partitioned physical query operator determined to have the lowest cost value is selected to execute the logical query operator.

7. A computer-implemented method, comprising:

determining, starting at a lowest level of a query operator tree representation of a query of data stored in one or more table partitions within a plurality of operator execution locations for a first partitioned physical query operator in the query operator tree, a partition-wise placement cost based on a cost attribute of each of the one or more table partitions associated with the first partitioned physical query operator and a partition-wise placement cost of any child physical query operator of the first partitioned physical query operator, the first partitioned physical query operator operating on the one or more table partitions within the plurality of operator execution locations and the partition-wise placement cost for each of the one or more table partitions including a cost for each of the plurality of operator execution locations and a transfer cost;

determining a placement cost for the first partitioned physical query operator for each of the plurality of operator execution locations based on a consolidation of the determined partition-wise placement costs for the first partitioned physical query operator;

determining, for a logical query operator associated with the first partitioned physical query operator, a merged placement cost for each of the plurality of operator execution locations, the merged placement cost including an indication of the physical query operator having a lowest cost value with and without the transfer cost of the partition-wise placement cost; and determining an execution location for the first partitioned physical query operator based on the determined partition-wise placement cost for the first partitioned physical query operator by traversing the query operator tree starting from a highest level down to the lowest level of the query operator tree.

8. A method according to claim 7, further comprising:

determining, for a first non-partitioned physical query operator in the query operator tree, a second placement cost for each of the plurality of operator execution locations based on placement costs of any child physical operators of the first non-partitioned physical query operator;

determining, for a second logical query operator associated with the first non-partitioned physical query operator, a second merged placement cost for each of the plurality of operator execution locations, the second merged placement cost including an indication of the physical query operator having a lowest cost value with and without the transfer cost of the partition-wise placement cost for the second logical query operator; and determining an execution location for the first non-partitioned physical query operator based on the determined second placement cost for the second non-partitioned physical query operator by traversing the query operator tree starting from the highest level down to the lowest level of the query operator tree.

9. A method according to claim 8, further comprising:

determining, for a second partitioned physical query operator in the query operator tree where the second partitioned physical query operator is a parent of the first partitioned physical query operator, a third partition-wise placement cost based on a cost attribute of each of the one or more table partitions associated with the second partitioned physical query operator and the partition-wise placement cost of the first partitioned physical query operator, the second partitioned physical query operator operating on the one or more table partitions within the plurality of operator execution locations and the partition-wise placement cost for each of the one or more table partitions including a cost for each of the plurality of operator execution locations and a transfer cost for the second partitioned physical query operator;

determining a third placement cost for the second partitioned physical query operator physical query operator for each of the plurality of operator execution locations based on a consolidation of the determined third partition-wise placement costs for the second partitioned physical query operator;

determining, for a third logical query operator associated with the second partitioned physical query operator, a second merged placement cost for each of the plurality of operator execution locations, the second merged placement cost including an indication of the physical query operator having a lowest cost value with and without the transfer cost of the partition-wise placement cost for the second partitioned physical query operator; and determining an execution location for the second partitioned physical query operator based on the determined third partition-wise placement cost for the second partitioned physical query operator by traversing the query operator tree starting from the highest level down to the lowest level of the query operator tree.

10. A method according to claim 9, further comprising:
determining, for a third partitioned physical query operator in the query operator tree where the third partitioned physical query operator is associated with the logical query operator, a fourth partition-wise placement cost based on a cost attribute of each of the one or more table partitions associated with the third partitioned physical query operator;
determining a fourth placement cost for the third partitioned physical query operator for each of the plurality of operator execution locations based on the determined fourth partition-wise placement cost, the third partitioned physical query operator operating on the one or more table partitions within the plurality of operator execution locations and the fourth partition-wise placement cost for each partition including a cost attribute for each of the plurality of operator execution locations and a transfer cost for the third partitioned physical query operator; and
determining one of the first partitioned physical query operator and the third partitioned physical query operator to execute the logical query operator based on the merged placement cost for the first partitioned physical query operator and the third partitioned physical query operator by traversing the query operator tree starting from the highest level down to the lowest level of the query operator tree, wherein the first partitioned physical query operator and the third partitioned physical query operator determined to have the lowest cost value is selected to execute the logical query operator.

11. A method according to claim 7, further comprising:
determining, for a second partitioned physical query operator in the query operator tree where the second partitioned physical query operator is a parent of the first partitioned physical query operator, a second partition-wise placement cost based on a cost attribute of each of the one or more table partitions associated with the second partitioned physical query operator and the partition-wise placement cost of the first partitioned physical query operator, the second partitioned physical query operator operating on the one or more table partitions within the plurality of operator execution locations and the partition-wise placement cost for each of the one or more table partitions including a cost attribute for each of the plurality of operator execution locations and a transfer cost for the second partitioned physical query operator;
determining a second placement cost for the second partitioned physical query operator for each of the plurality of operator execution locations based on a consolidation of the determined second partition-wise placement costs for the second partitioned physical query operator;
determining, for a second logical query operator associated with the second partitioned physical query operator, a second merged placement cost for each of the plurality of operator execution locations, the second merged placement cost including an indication of the physical query operator having a lowest cost value with and without the transfer cost of the second partition-wise placement cost; and
determining an execution location for the second partitioned physical query operator based on the determined second partition-wise placement cost for the second partitioned physical query operator by traversing the query operator tree starting from the highest level down to the lowest level of the query operator tree.

12. A method according to claim 7, further comprising:
determining, for a second partitioned physical query operator in the query operator tree where the second partitioned physical query operator is associated with the logical query operator, a second partition-wise placement cost based on a cost attribute of each of the one or more table partitions associated with the second partitioned physical query operator;
determining a second placement cost for the second partitioned physical query operator for each of the plurality of operator execution locations based on a consolidation of the determined second partition-wise placement costs for the first partitioned physical query operator; and
determining one of the first partitioned physical query operator and the second partitioned physical query operator to execute the logical query operator based on the merged placement cost by traversing the query operator tree starting from the highest level down to the lowest level of the query operator tree, wherein the first partitioned physical query operator and the second partitioned physical query operator determined to have the lowest cost value is selected to execute the logical query operator.

13. A database node comprising:
a compilation server to:
determine, starting at a lowest level of a query operator tree representation of a query of data stored in one or more table partitions within a plurality of operator execution locations for a first partitioned physical query operator in the query operator tree, a partition-wise placement cost based on a cost attribute of each of the one or more table partitions associated with the first partitioned physical query operator and a partition-wise placement cost of any child physical query operator of the first partitioned physical query operator, the first partitioned physical query operator operating on the one or more table partitions within the plurality of operator execution locations and the partition-wise placement cost for each of the one or more table partitions including a cost attribute for each of the plurality of operator execution locations and a transfer cost;
determine a placement cost for the first partitioned physical query operator for each of a plurality of operator execution locations based on a consolidation of the determined partition-wise placement costs for the first partitioned physical query operator;
determine, for a logical query operator associated with the first partitioned physical query operator, a merged placement cost for each of the plurality of operator execution locations, the merged placement cost including an indication of the physical query operator having a lowest cost value with and without the transfer cost of the partition-wise placement cost; and
determine an execution location for the first partitioned physical query operator based on the determined partition-wise placement cost for the first partitioned physical query operator by traversing the query operator tree starting from a highest level down to the lowest level of the query operator tree.

14. A database node according to claim 13, the compilation server further to:
determine, for a first non-partitioned physical query operator in the query operator tree, a second placement cost for each of the plurality of operator execution locations based on placement costs of any child physical operators of the first non-partitioned physical query operator;

determine, for a second logical query operator associated with the first non-partitioned physical query operator, a second merged placement cost for each of the plurality of operator execution locations, the second merged placement cost including an indication of the physical query operator having a lowest cost value with and without the transfer cost of the partition-wise placement cost for the second logical query operator; and determine an execution location for the first non-partitioned physical query operator based on the determined second placement cost for the second non-partitioned physical query operator by traversing the query operator tree starting from the highest level down to the lowest level of the query operator tree.

15. A database node according to claim 14, the compilation server further to:

determine, for a second partitioned physical query operator in the query operator tree where the second partitioned physical query operator is a parent of the first partitioned physical query operator, a third partition-wise placement cost based on a cost attribute of each of the one or more table partitions associated with the second partitioned physical query operator and the partition-wise placement cost of the first partitioned physical query operator, the second partitioned physical query operator operating on the one or more table partitions within the plurality of operator execution locations and the partition-wise placement cost for each of the one or more table partitions including a cost for each of the plurality of operator execution locations and a transfer cost for the second partitioned physical query operator;

determine a third placement cost for the second partitioned physical query operator physical query operator for each of the plurality of operator execution locations based on a consolidation of the determined third partition-wise placement costs for the second partitioned physical query operator;

determine, for a third logical query operator associated with the second partitioned physical query operator, a second merged placement cost for each of the plurality of operator execution locations, the second merged placement costs including an indication of the physical query operator having a lowest cost value with and without the transfer cost of the partition-wise placement cost for the second partitioned physical query operator; and determine an execution location for the second partitioned physical query operator based on the determined third partition-wise placement cost for the second partitioned physical query operator by traversing the query operator tree starting from the highest level down to the lowest level of the query operator tree.

16. A database node according to claim 15, the compilation server further to:

determine, for a third partitioned physical query operator in the query operator tree where the third partitioned physical query operator is associated with the logical query operator, a fourth partition-wise placement cost based on a cost attribute of each of the one or more table partitions associated with the third partitioned physical query operator;

determine a fourth placement cost for the third partitioned physical query operator for each of the plurality of operator execution locations based on the determined fourth partition-wise placement cost, the third partitioned physical query operator operating on the one or more table partitions within the plurality of operator execution locations and the fourth partition-wise placement cost for each partition including a cost attribute for each of the plurality of operator execution locations and a transfer cost for the third partitioned physical query operator; and determine one of the first partitioned physical query operator and the third partitioned physical query operator to execute the logical query operator based on the merged placement cost for the first partitioned physical query operator and the third partitioned physical query operator by traversing the query operator tree starting from the highest level down to the lowest level of the query operator tree, wherein the first partitioned physical query operator and the third partitioned physical query operator determined to have the lowest cost value is selected to execute the logical query operator.

17. A database node according to claim 13, the compilation server further to:

determine, for a second partitioned physical query operator in the query operator tree where the second partitioned physical query operator is a parent of the first partitioned physical query operator, a second partition-wise placement cost based on a cost attribute of each of the one or more table partitions associated with the second partitioned physical query operator and the partition-wise placement cost of the first partitioned physical query operator, the second partitioned physical query operator operating on the one or more table partitions within the plurality of operator execution locations and the partition-wise placement cost for each of the one or more table partitions including a cost attribute for each of the plurality of operator execution locations and a transfer cost for the second partitioned physical query operator;

determine a second placement cost for the second partitioned physical query operator for each of the plurality of operator execution locations based on the determined second partition-wise placement costs for the second partitioned physical query operator;

determine, for a second logical query operator associated with the second partitioned physical query operator, a second merged placement cost for each of the plurality of operator execution locations, the second merged placement cost including an indication of the physical query operator having a lowest cost value with and without the transfer cost of the second partition-wise placement cost; and determine an execution location for the second partitioned physical query operator based on the determined second partition-wise placement cost for the second partitioned physical query operator by traversing the query operator tree starting from the highest level down to the lowest level of the query operator tree.

18. A database node according to claim 13, the compilation server further to:

determine, for a second partitioned physical query operator in the query operator tree where the second partitioned physical query operator associated with the logical query operator, a second partition-wise placement cost based on a cost attribute of each of the one or more table partitions associated with the second partitioned physical query operator;

determine a second placement cost for the second partitioned physical query operator for each of the plurality of operator execution locations based on a consolidation of the determined second partition-wise placement costs for the first partitioned physical query operator; and determine one of the first partitioned physical query operator and the second partitioned physical query operator to execute the logical query operator based on the merged placement cost by traversing the query operator tree starting from the highest level down to the lowest level of the query operator tree, wherein the first partitioned physical query operator and the second partitioned physical query operator determined to have the lowest cost value is selected to execute the logical query operator.

\* \* \* \* \*